Aug. 2, 1966  H. LERMAN ET AL  3,264,639
SHAFT ANGLE DIGITIZER
Filed Nov. 27, 1963

HAROLD LERMAN
ALLAN GERARD
INVENTORS

BY S. A. Giaratana
Francis L. Masselle
ATTORNEYS

United States Patent Office 3,264,639
Patented August 2, 1966

3,264,639
SHAFT ANGLE DIGITIZER
Harold Lerman, Paramus, and Allan Gerard, Fort Lee,
N.J., assignors to General Precision Inc., Little Falls,
N.J., a corporation of Delaware
Filed Nov. 27, 1963, Ser. No. 326,548
8 Claims. (Cl. 340—347)

The present invention relates to encoders for producing digital signals representing shaft angles, and more particularly to a shaft angle digital counting arrangement employing a simple logic circuit energized by magnetic reed switches which in turn are controlled by a magnetic cam.

Prior to the present invention, a standard solution to the problem of providing a digital readout of a shaft angle was to employ an expensive incremental code wheel. In accordance with the present invention a smaller, simpler and less expensive shaft angle digital counting arrangement is provided which employs a simple disc having an arcuate magnet around one quarter of the periphery thereof for actuating a pair of magnetic reed switches overlying the periphery of the disc and spaced approximately 45° from one another. The disc is connected to the shaft whose angle is to be measured by a suitable gearing ratio so as to rotate a large number of times for each revolution of the shaft. The reed switches are connected to a clockwise AND gate and a counter clockwise AND gate with a capacitor provided in the connection of one of the switches to each of the AND gates to differentiate the input to the AND gates controlled by the one switch. An inverter is also provided for inverting the differentiated input to the counter clockwise AND gate. With this arrangement the clockwise AND gate will produce an output pulse at a certain angular position for each revolution of the disc in a clockwise direction, and the counter clockwise disc will produce an output pulse at the same angular position each revolution of the disc in a counter clockwise direction. Depending on the gearing ratio connecting the magnetic cam to the shaft, any desired angular resolution may be achieved with resolutions of one pulse per 10 arc minutes of angular rotation being easily achievable and greater resolutions being possible with greater design care.

Accordingly, it is one object of the invention to provide a small, simple, and relatively inexpensive shaft angle digital counting device.

It is another object of the invention to provide a shaft angle digitizer employing standard reed switches actuated by a magnetic cam.

It is a further object of the invention to provide a shaft angle digitizer which produces an output in the form of serial pulses along two different lines, one for clockwise angular increments and one for counter clockwise angular increments.

It is a still furter object of the invention to provide a shaft angle digitizer of the type described in which the output pulses are generated at exactly the same angular position of the magnetic cam in both the clockwise and counter clockwise directions of rotation.

Other objects and features of novelty of the present invention will be specifically pointed out or will otherwise become apparent when referring, for a better understanding of the invention, to the following description taken in conjunction with the accompanying drawings, wherein.

Figure 1:
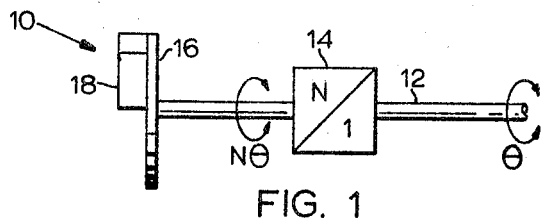
FIG. 1 is a side view of a magnetic cam connected to a shaft whose angle is to be measured by a suitable gear ratio in accordance with the present invention.
Figure 2:
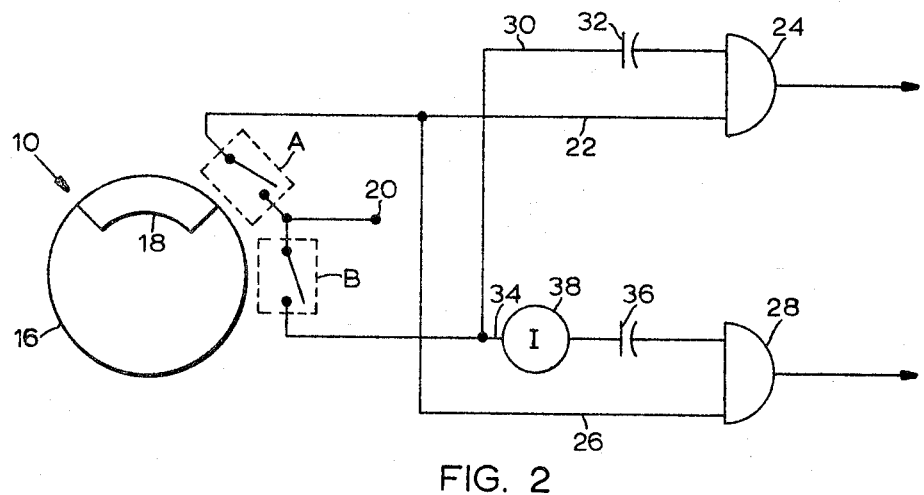
FIG. 2 is a view of the face of the magnetic cam of FIG. 1 with the magnetic reed switches operated thereby shown schematically along with the logic circuitry controlled by the reed switches.

Referring to FIGS. 1 and 2 a magnetic cam 10 is illustrated which is geared by a suitable gearing arrangement 14 to a shaft 12 whose angle is to be measured so that the magnetic cam is rotated any multiple number of time N for each revolution of the shaft 12. Stated otherwise when the shaft 12 rotates through an angle $\theta$ the magnetic cam 10 rotates through an angle $N\theta$. The magnetic cam 10 comprises a disc 16 having an arcuate magnet 18 on the face thereof which, in this embodiment, covers exactly one-quarter of the periphery of the disc 16. A pair of magnetic reed switches A and B overlie the magnet 18 and are spaced 45° apart from one another. Each of the switches are normally open and are closed when the end of the magnet 18 moves therebeneath.

The adjacent ends of each of the reed switches are connected to a terminal 20 which supplies 28-volt D.C. power. The other end of the switch A is connected by a line 22 to a clockwise AND gate 24 and by a line 26 to a counterclockwise AND gate 28. The other end of the switch B is capacitively coupled to the AND gate 24 by a line 30 and capacitor 32 and to the AND gate 28 by a line 34 and capacitor 36 with a suitable inverter 38 interposed ahead of the capacitor to invert the voltage applied thereto.

Figure 3:
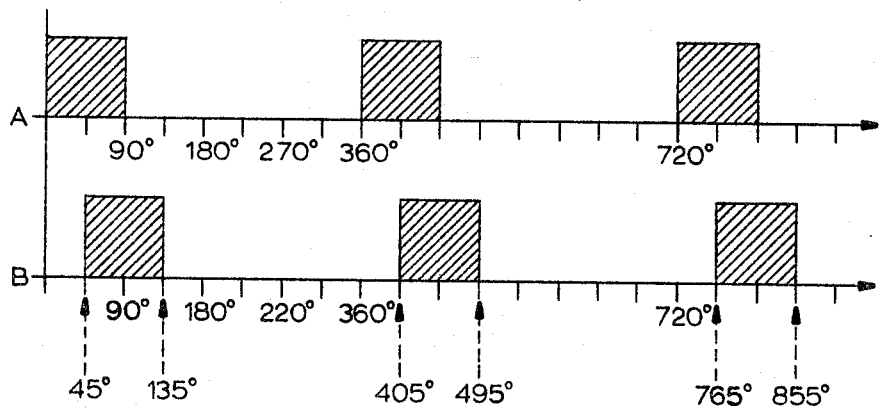
FIG. 3 illustrates the waveforms of the outputs of the reed switches.

Referring to FIGS. 2 and 3, as the magnetic cam 10 turns clockwise from the position illustrated in FIG. 2 which shall be referred to as the 0° position, the switch A closes and remains closed through 90° as illustrated by the waveform for switch A in FIG. 3. Both AND gates 24 and 28 are enabled while switch A is closed. When switch B closes at the 45° position, a positive differentiated input pulse is applied to the AND gate 24 and the AND gate 24 produces an output pulse of short duration. However, no output pulse is produced at the AND gate 28 because the differentiated input pulse is inverted by the inverter 38. At the 90° position switch A opens to disable both gates, and at the 135° position switch B opens so that a positive differentiated input pulse appears at the input of the gate 28, but since the gate has been disabled by the previous opening of the switch A no output is produced. The above-described cycle repeats itself with each revolution of the magnetic cam.

To describe the counter clockwise sequence of operation, let us assume that the magnetic cam is in the 270° position and is rotated in a counter clockwise direction from this position. At the 135° position the switch B closes but no output pulse occurs at the AND gates 24 and 28 since they are both disabled because the switch A is open. At the 90° position switch A closes to enable both of the gates, but no output pulse is produced by the gates. At the 45° position switch B opens to apply a negative differentiated pulse at the input of the gate 24 so that no output appears at this gate even though it is enabled. The same negative differentiated pulse is inverted by the inverter 38 and applied as a positive pulse at the input of the gate 28 and an output pulse is produced by the gate 28.

From the foregoing, it is apparent that an output pulse is produced at the 45° angular position by the gate 24 when the magnetic cam is rotating in a clockwise direction and a similar output pulse is produced by the gate 28 at the same 45° position when the magnetic cam is rotating in a counter clockwise direction. The magnetic reed switches have a hysteresis of about 15° so that the output pulses of the gates 24 and 28 will be separated in time during a rocking angular motion.

While it will be apparent that the embodiment of the invention is well calculated to fulfill the objects of the invention, it will be appreciated that many modifications and changes may be made therein without departing from the proper scope and fair meaning of the invention as defined by the following claims. For example a second arcuate magnet identical to the first magnet 18 could be mounted on the disc 16 diametrically opposite the magnet 18 so that two output pulses would be produced per revolution of the magnetic cam in either direction.

What is claimed is:

1. A shaft angle digitizer comprising first and second AND gates, first switch means enabling each of said gates when actuated in a first direction and disabling each of said gates when actuated in a second direction, second switch means capacitively coupled to said first and second gates for applying an input pulse of one polarity to each of said gates when actuated in a first direction and an input pulse of an opposite polarity when actuated in a second direction, inverter means for inverting the input signal to said second gate, and rotatable coded means for actuating said first and second switch means at predetermined angular positions of the coded means, said coded means actuating said first switch means in said first direction at a first angular position and actuating said first switch means in said second direction at a second angular position, said coded means actuating said second switch means in said first direction at a point midway between said first and second angular positions and actuating said second switch means in said second direction after rotating through an angle equal to the angle between said first and second angular positions.

2. The invention as defined in claim 1 wherein said first and second angular positions are spaced apart from one another a predetermined angle less than 180°.

3. The invention as defined in claim 1 wherein said rotatable coded means comprises a rotatable magnetic cam having a portion of its periphery formed by an arcuate magnet and wherein said first and second switch means comprise reed switches overlying said magnetic cam in position to be actuated by said arcuate magnet.

4. The invention as defined in claim 3 wherein said arcuate magnet covers 90° of the periphery of said magnetic cam and said reed switches are angularly spaced 45° from one another.

5. The invention as defined in claim 4 including a D.C. voltage source connected to one end of each of said reed switches and wherein the other end of said first reed switch is connected directly to said first and second AND gates and the other end of said second reed switch is capacitively coupled to said first and second AND gates.

6. A shaft angle digitizer comprising rotatable coded means adapted to be connected to a shaft whose angle is to be measured for rotation therewith, first and second switch means overlying the periphery of said coded means in angularly spaced relation, said coded means actuating said first switch means in a first direction at a first angular position thereof and actuating said first switch means in a second direction at a second angular position thereof, said coded means actuating said second switch means in a first direction at a third angular position thereof midway between said first and second angular positions and actuating said second switch means in a second direction after rotating through an angle equal to the angle between said first and second angular positions, the angle between said first and second angular positions being less than 180°, and logic circuit means for producing a first output signal each time said coded means reaches said third angular position when rotating in a clockwise direction and producing a second output signal each time said coded means reaches said third angular position when rotating in a counter clockwise direction.

7. The invention as defined in claim 6 wherein said first and second angular positions are spaced 90° from one another and said first and second switch means are spaced 45° from one another.

8. The invention as defined in claim 6 wherein said first and second switch means each comprise a magnetic reed switch and said coded means has an arcuate magnet forming less than 180° of the circumference thereof for actuating said magnetic reed switches.

No references cited.

MAYNARD R. WILBUR, *Primary Examiner.*

K. R. STEVENS, *Assistant Examiner.*